(12) United States Patent
Heinrichs et al.

(10) Patent No.: US 12,203,308 B2
(45) Date of Patent: Jan. 21, 2025

(54) VEHICLE HOOD

(71) Applicant: Honda Motor Co., Ltd., Tokyo (JP)

(72) Inventors: Steven C. Heinrichs, Dublin, OH (US); Patrick J. Ellison, Plain City, OH (US); Taiga Marukawa, Rochester Hills, MI (US); Kosaku Tomozawa, Utsunomiya (JP); Akira Futatsuhashi, Utsunomiya (JP); Gilberto Larrache-Irizarry, Delaware, OH (US); Stephen D Rosenkrantz, Columbus, OH (US); Keiichiro Tsuji, Novi, MI (US); Takashi Nakano, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 373 days.

(21) Appl. No.: 17/710,701

(22) Filed: Mar. 31, 2022

(65) Prior Publication Data
US 2023/0313579 A1 Oct. 5, 2023

(51) Int. Cl.
*B62D 25/10* (2006.01)
*B60J 5/10* (2006.01)
*E05D 5/02* (2006.01)

(52) U.S. Cl.
CPC .............. *E05D 5/0207* (2013.01); *B60J 5/10* (2013.01); *B62D 25/105* (2013.01);
(Continued)

(58) Field of Classification Search
CPC ............ B62D 25/105; E05Y 2900/536; E05Y 2800/694; E05Y 2600/626
See application file for complete search history.

(56) References Cited

U.S. PATENT DOCUMENTS

| | | |
|---|---|---|
| 6,442,801 B1 | 9/2002 | Kim |
| 6,834,735 B2 | 12/2004 | Kim |
| (Continued) | | |

FOREIGN PATENT DOCUMENTS

| | | |
|---|---|---|
| CN | 204311882 U | 5/2015 |
| CN | 104675243 B | 6/2017 |
| (Continued) | | |

OTHER PUBLICATIONS

English translation of Song Jae Yeol, Active Hinge Device of Automobile Hood that have Double Rivet Structure, 2013, Korea, KR-1520549-B1, pp. 1-7 (Year: 2015).*

*Primary Examiner* — Jason D Shanske
*Assistant Examiner* — James J Triggs
(74) *Attorney, Agent, or Firm* — Mark Duell; American Honda Motor Co., Inc.

(57) ABSTRACT

A hood for a vehicle is movable between an open position and a closed position for covering a vehicle compartment. The hood includes a hood body having an exterior facing surface and an interior facing surface. A first bracket attached to the interior facing surface of the hood body includes a bottom end having a downward opening slot a rotatable hinge attached to the vehicle in the vehicle compartment for moving the hood body between the open position and the closed position. A second bracket is attached to the vehicle in the vehicle compartment. The second bracket is attached to a distal end of the rotatable hinge and includes a weld stud extending laterally from a side of the second bracket. The first bracket is seated on the weld stud during installation of the hood.

16 Claims, 3 Drawing Sheets

(52) U.S. Cl.
CPC ....... *E05Y 2600/51* (2013.01); *E05Y 2600/62* (2013.01); *E05Y 2600/626* (2013.01); *E05Y 2900/536* (2013.01)

(56) References Cited

U.S. PATENT DOCUMENTS

| | | |
|---|---|---|
| 7,100,973 B2 | 9/2006 | Aigner et al. |
| 7,506,716 B1 | 3/2009 | Salmon et al. |
| 7,594,555 B2 | 9/2009 | Lutter et al. |
| 7,845,053 B2 | 12/2010 | Marsh et al. |
| 7,896,122 B2 | 3/2011 | Borg et al. |
| 7,934,293 B2 | 5/2011 | Kalargeros |
| 9,340,179 B2 | 5/2016 | Kim et al. |
| 9,701,275 B2 | 7/2017 | Kim et al. |
| 10,315,612 B2 | 6/2019 | Yamada |
| 2014/0298617 A1* | 10/2014 | Krajenke .............. E05F 1/1238 16/277 |

FOREIGN PATENT DOCUMENTS

| | | |
|---|---|---|
| CN | 207553821 U | 6/2018 |
| DE | 202009009560 U1 | 9/2009 |
| GB | 2451622 B | 2/2009 |
| JP | 2002037129 A | 2/2002 |
| JP | 4349567 B2 | 5/2005 |
| KR | 100398427 B1 | 9/2003 |
| KR | 100405605 B1 | 11/2003 |
| KR | 100410836 B1 | 12/2003 |
| KR | 101520549 B1 | 5/2015 |
| WO | 2004094204 A1 | 11/2004 |

\* cited by examiner

US 12,203,308 B2

VEHICLE HOOD

TECHNICAL FIELD

The embodiments described herein are related to field of vehicle hoods, and more specifically to the attachment of a vehicle hood to hinge.

BACKGROUND

There is a need to improve efficiency and ergonomics in the installation of a vehicle hood on a vehicle. In particular, there is need to be able to place the hood in place such that it will remain in place until a manufacturing associate has an opportunity to apply fasteners to complete the installation process.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

According to an aspect, a hood for a vehicle movable between an open position and a closed position for covering a vehicle compartment includes a hood body having an exterior facing surface and an interior facing surface, a first bracket attached to the interior facing surface of the hood body, the first bracket including a bottom end having a downward opening slot a rotatable hinge attached to the vehicle in the vehicle compartment for moving the hood body between the open position and the closed position, a second bracket attached to the vehicle in the vehicle compartment, the second bracket being attached to a distal end of the rotatable hinge, the second bracket including a weld stud extending laterally from a side of the second bracket, and wherein the first bracket is seated on the weld stud during installation of the hood.

According to another aspect, a vehicle includes a compartment, and a hood movable between an open position and a closed position for covering the compartment. The hood includes a hood body having an exterior facing surface and an interior facing surface, a first bracket attached to the interior facing surface of the hood body, the first bracket including a bottom end having a downward opening slot, a rotatable hinge attached to the vehicle in the vehicle compartment for moving the hood body between the open position and the closed position, a second bracket attached to the vehicle in the vehicle compartment, the second bracket being attached to a distal end of the rotatable hinge, the second bracket including a weld stud extending laterally from a side of the second bracket, and wherein the first bracket is seated on the weld stud during installation of the hood.

According to yet another aspect, a hood for a vehicle movable between an open position and a closed position for covering a vehicle compartment includes a hood body having an exterior facing surface and an interior facing surface, a first bracket attached to the interior facing surface of the hood body, the first bracket including a bottom end having a downward opening slot, a rotatable hinge attached to the vehicle in the vehicle compartment for moving the hood body between the open position and the closed position, the rotatable hinge including a weld stud extending laterally from a side of the second bracket, and wherein the first bracket is seated on the weld stud during installation of the hood.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
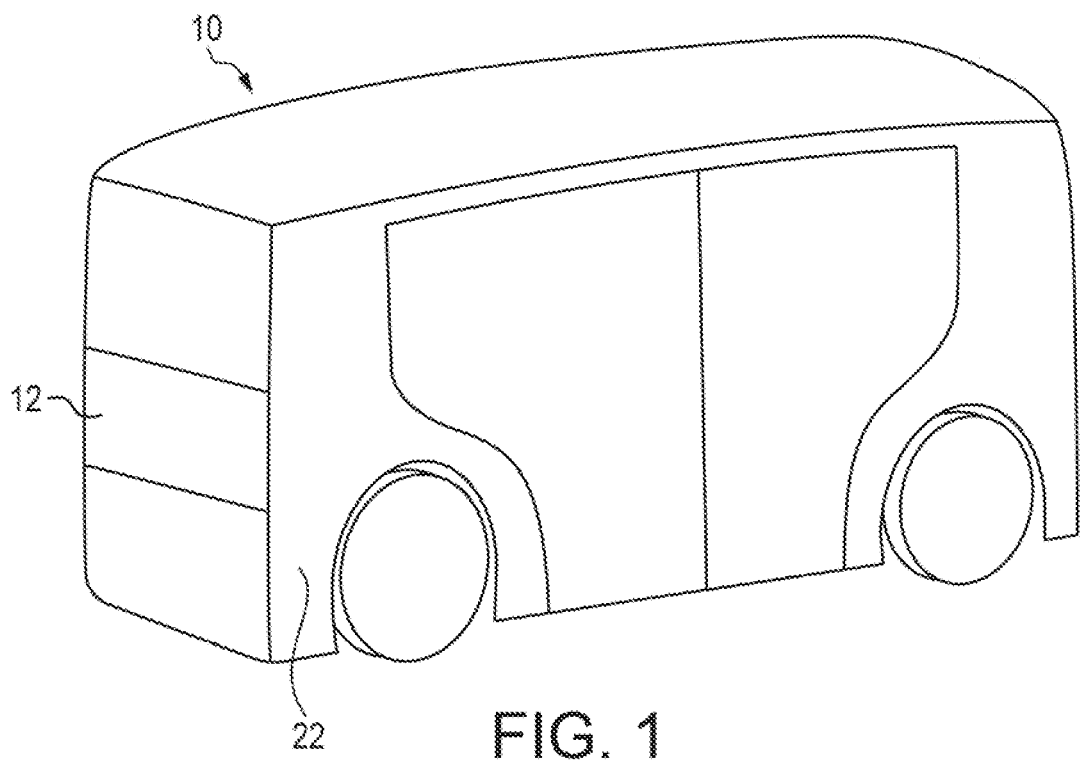
FIG. 1 is a perspective view of a vehicle with a hood in a closed position.
Figure 2:
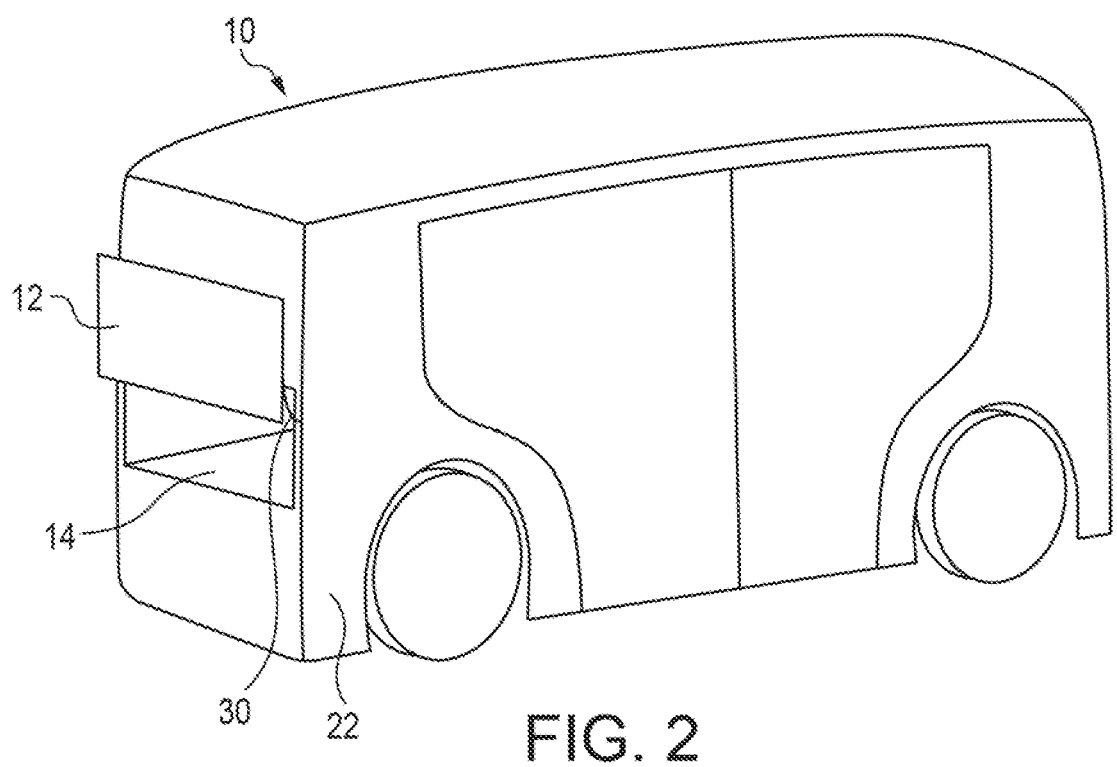
FIG. 2 is a perspective view of the vehicle with the hood in an open position.

FIGS. 1-2 are perspective views of a vehicle 10 with hood 12 that is movable between a closed position, as illustrated in FIG. 1, to an open position, as illustrated in FIG. 2, for covering a compartment 14 in the vehicle 10, such as a trunk, engine compartment, motor compartment, or any other compartment providing access to interior space in the vehicle 10.

Figure 3:
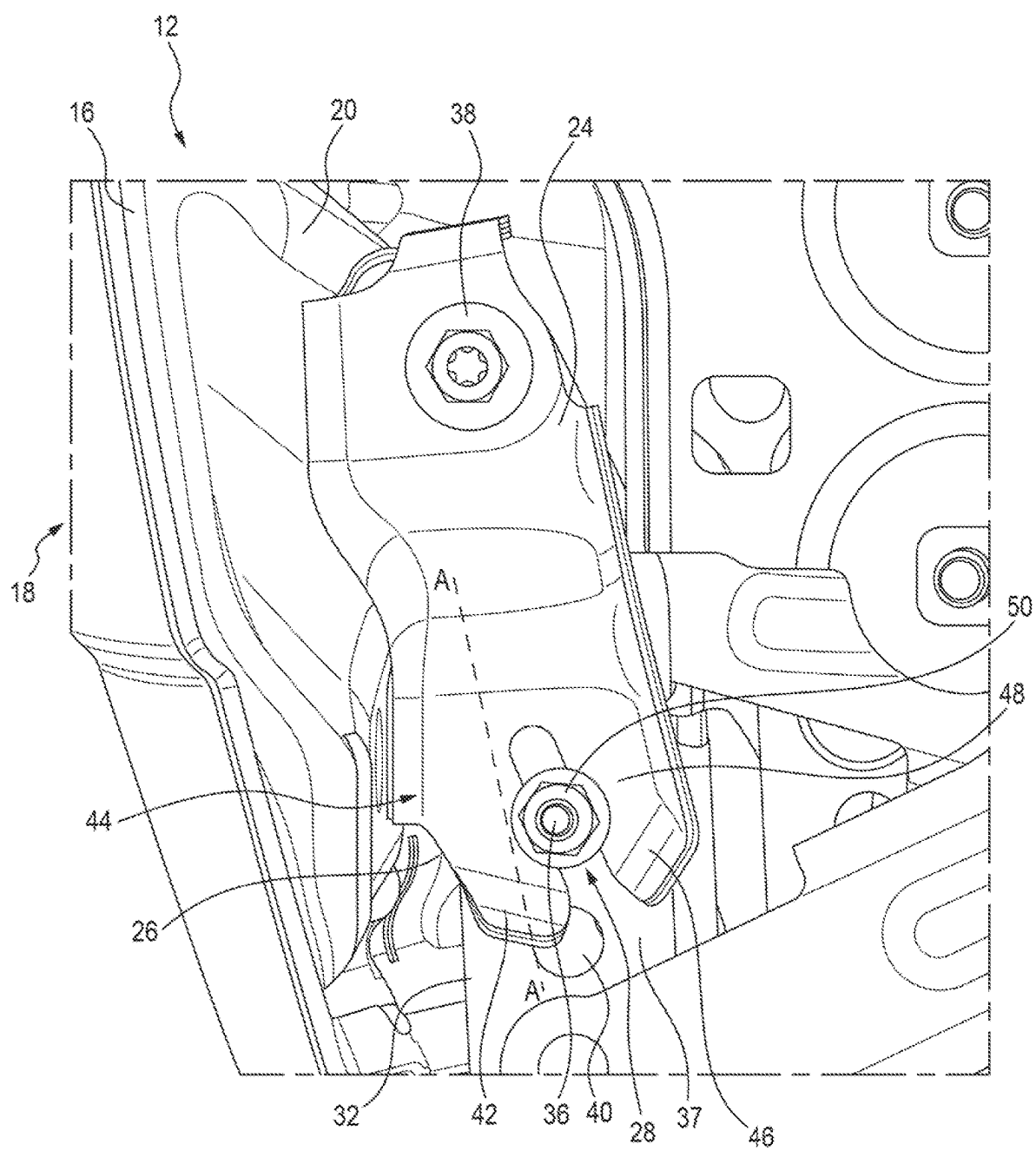
FIG. 3 is a side view of a bracket and hinge assembly according to the embodiment described herein.

Referring to FIG. 3, the hood 12 includes a hood body 16, which includes an exterior facing surface 18 and an interior facing surface 20. The hood body 16 may be constructed of a metal, such as steel, aluminum, magnesium, manganese, or alloys or combination thereof, any other suitable metals, fiberglass, resin, or any other composited materials or combinations thereof. The hood body 16 may be constructed of the same material as the rest of the body 22 of the vehicle 10, or of a different material as weight and performance targets dictate in a manner familiar with those skilled in the art. The exterior facing surface 18 of the hood body 16 may be finished in the same manner as the rest of the body 22 of the vehicle 10 as it is visible. The interior facing surface 20 may be finished similar to other non-visible surfaces of the body 22 of the vehicle 10.

Figure 4:
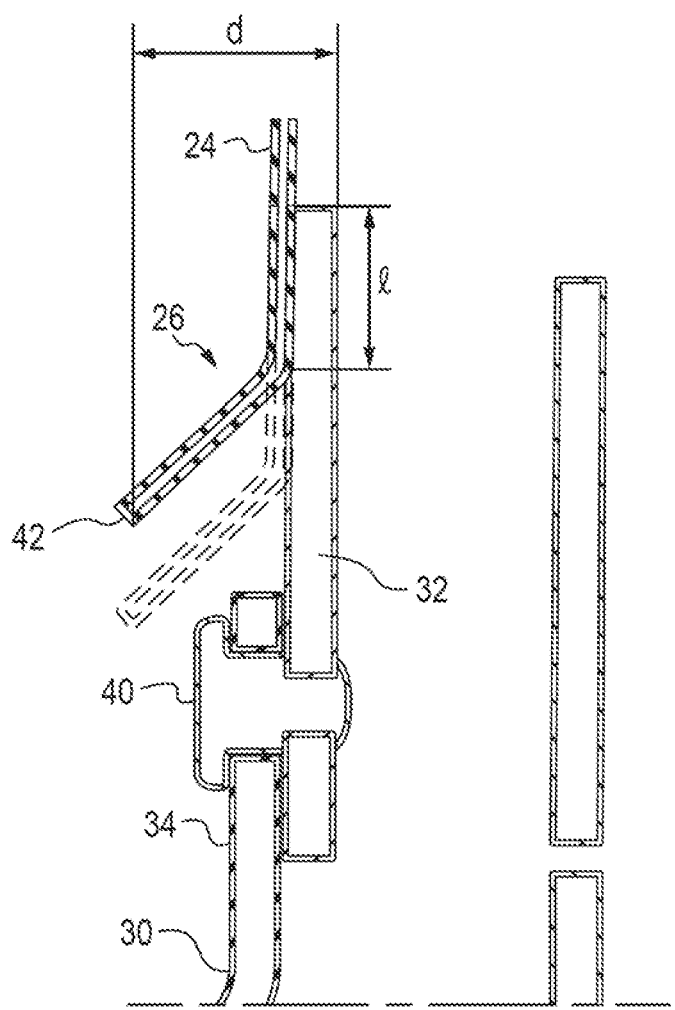
FIG. 4 is a cross section of FIG. 3 taken along line A-A in FIG. 3.

The hood 12 further includes a first bracket 24 attached to the interior facing surface 20 of the hood body 16. The first bracket 24 includes a bottom end 26 having a downward opening slot 28. The hood 12 further includes a rotatable hinge 30 attached to the vehicle 10 in the compartment 14 for moving the hood body 16 between the open position and the closed position. A second bracket 32 is preferably attached to a distal end 34 of the rotatable hinge 30, illustrated in FIG. 4, which is a cross section along line A-A in FIG. 3. The second bracket 32 may also include a weld stud 36 extending laterally from a side 37 of the second bracket 32.

The first bracket 24 is seated on the weld stud 36 during installation of the hood 12 to hold the hood 12 in place while a manufacturing associate installs a first fastener 38 for attaching the first bracket 24 to the second bracket 32. The first fastener 38 may be a bolt, screw, rivet, or any other suitable fastener known to those skilled in the art. The first bracket 24 is lifted upwardly off the weld stud 36 when the first fastener 38 is installed to attach the first bracket 24 to the second bracket 32.

A second fastener 40 may be applied to attach the second bracket 32 to the rotatable hinge 30. The second fastener may be a rivet, screw, bolt, or any other suitable fastener known to those skilled in the art.

The downward opening slot 28 at the bottom end 26 of the first bracket 24 is further defined by a first angled extension 42 defining a first side 44 of the downward opening slot 28 and a second angled extension 46 defining a second side 48 of the downward opening slot 28. Each of the first and second angled extensions 42, 46 are angled at an angle between 30 degrees and 60 degrees from the first bracket 24 so the bottom end 26 of the first bracket 24 does not interfere with or contact the second fastener 40. In the embodiment illustrated in FIG. 3, each of the first and second angled extensions 42, 46 are angled at an angle of 45 degrees. The first and second angled extensions 42, 46 are angled such that the depth d of the assembled first and second brackets 24, 32 is approximately 8 mm. The travel length of the downward opening slot 28 has a length l that is approximately 10 mm, and the width of the downward opening slot is defined by the size of the weld stud 36 on which the first bracket 24 rests. The weld stud 36 may then be capped by a third fastener 50, such as a nut.

The first and second brackets 24, 32 and the rotatable hinge may be constructed of any suitable materials that may include metals such as steel, aluminum, magnesium, or composites or resins, or any suitable material known to those skilled in the art. Materials should be chosen to avoid galvanic corrosion and other concerns known to those skilled in the art if mixed materials are selected.

As previously stated, the first bracket 24 is seated on the weld stud 36 during installation of the hood 12 to hold the hood 12 in place while a manufacturing associate installs a first fastener 38 for attaching the first bracket 24 to the second bracket 32. The downward opening slot 28 prevents the hood 12 from falling off of the weld stud 36, thereby freeing the manufacturing associate to install the first fastener 38 is installed to attach the first bracket 24 to the second bracket 32.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A hood for a vehicle movable between an open position and a closed position for covering a vehicle compartment, comprising:
   a hood body having an exterior facing surface and an interior facing surface;
   a first bracket attached to the interior facing surface of the hood body, the first bracket including a bottom end having a downward opening slot;
   a rotatable hinge attached to the vehicle in the vehicle compartment for moving the hood body between the open position and the closed position
   a second bracket attached to the vehicle in the vehicle compartment, the second bracket being attached to a distal end of the rotatable hinge, the second bracket including a weld stud extending laterally from a side of the second bracket;
   a first fastener for attaching the first bracket to the second bracket;
   wherein the first bracket is configured to be seated on the weld stud only during installation of the hood; and
   wherein the first bracket is lifted upwardly off of the weld stud when the first fastener attaches the first bracket to the second bracket.

2. The hood of claim 1 wherein the first fastener comprises:
   a bolt.

3. The hood of claim 1 further comprising:
   a second fastener for attaching the second bracket to the rotatable hinge.

4. The hood of claim 3 wherein the second fastener comprises:
   a rivet.

5. The hood of claim 3 wherein the bottom end of the first bracket further comprises:
   a first angled extension defining a first side of the downward opening slot; and
   a second angled extension defining a second side of the downward opening slot.

6. The hood of claim 5 wherein the first angled extension is bent at an angle between 30 degrees and 60 degrees from the first bracket.

7. The hood of claim 6 wherein the second angled extension is bent at an angle between 30 degrees and 60 degrees from the first bracket.

8. The hood of claim 7 wherein the first angled extension and the second angle extension are angled to avoid interference with the second fastener.

9. The hood of claim 8 wherein the first angled extension and the second angle extension are bent at an angle of 45 degrees from the first bracket.

10. A vehicle, comprising:
    a compartment;
    a hood movable between an open position and a closed position for covering the compartment, comprising:
       a hood body having an exterior facing surface and an interior facing surface;
       a first bracket attached to the interior facing surface of the hood body, the first bracket including a bottom end having a downward opening slot;
       a rotatable hinge attached to the vehicle in the compartment for moving the hood body between the open position and the closed position;
       a second bracket attached to the vehicle in the compartment, the second bracket being attached to a distal end of the rotatable hinge, the second bracket including a weld stud extending laterally from a side of the second bracket;

a first fastener for attaching the first bracket to the second bracket;

wherein the first bracket is configured to be seated on the weld stud only during installation of the hood; and wherein the first bracket is lifted upwardly off of the weld stud when the first fastener attaches the first bracket to the second bracket.

11. The vehicle of claim 10 further comprising:

a second fastener for attaching the second bracket to the rotatable hinge.

12. The vehicle of claim 11 wherein the bottom end of the first bracket further comprises:

a first angled extension defining a first side of the downward opening slot; and a second angled extension defining a second side of the downward opening slot.

13. The vehicle of claim 12 wherein the first angled extension and the second angled extension are angled to avoid interference with the second fastener.

14. The vehicle of claim 13 wherein the first angled extension and the second angled extension are bent at an angle of 45 degrees from the first bracket.

15. A hood for a vehicle movable between an open position and a closed position for covering a vehicle compartment, comprising:

a hood body having an exterior facing surface and an interior facing surface;

a first bracket attached to the interior facing surface of the hood body, the first bracket including a bottom end having a downward opening slot;

a rotatable hinge attached to the vehicle in the vehicle compartment for moving the hood body between the open position and the closed position, the rotatable hinge including a weld stud extending laterally from a side of a second bracket;

a first fastener for attaching the first bracket to the second bracket;

wherein the first bracket is configured to be seated on the weld stud only during installation of the hood; and wherein the first bracket is lifted upwardly off of the weld stud when the first fastener attaches the first bracket to the second bracket.

16. The hood of claim 15 further comprising:

a second fastener for attaching the first bracket to the rotatable hinge; and wherein the bottom end of the first bracket further comprises:

a first angled extension defining a first side of the downward opening slot;

a second angled extension defining a second side of the downward opening slot; and wherein the first angled extension and the second angled extension are bent at an angle of 45 degrees from the first bracket.

* * * * *